United States Patent [19]
Olson

[11] 4,081,797
[45] Mar. 28, 1978

[54] ON-SCREEN CHANNEL DISPLAY
[75] Inventor: John Emery Olson, Harbert, Mich.
[73] Assignee: Heath Company, Benton Harbor, Mich.
[21] Appl. No.: 551,918
[22] Filed: Feb. 21, 1975

Related U.S. Application Data
[63] Continuation of Ser. No. 303,338, Nov. 3, 1972, abandoned.

[51] Int. Cl.² .................................................. G06K 15/20
[52] U.S. Cl. ............................... 340/324 AD; 358/192
[58] Field of Search .......... 340/324 AD; 178/DIG. 6, 178/DIG. 15; 358/192

[56] References Cited
U.S. PATENT DOCUMENTS

| | | | |
|---|---|---|---|
| 3,345,458 | 10/1967 | Cole et al. | 340/324 AD |
| 3,528,068 | 9/1970 | Johnson | 340/324 AD |
| 3,532,806 | 10/1970 | Wicklund | 340/324 AD |
| 3,573,787 | 4/1971 | Sandgren et al. | 340/324 AD |
| 3,582,936 | 6/1971 | Kite | 340/324 AD |
| 3,609,743 | 9/1971 | Lasoff et al. | 340/324 AD |
| 3,701,988 | 10/1972 | Allaart | 340/324 AD |
| 3,714,663 | 1/1973 | Smith | 340/324 AD |
| 3,786,481 | 1/1974 | Hartman | 340/324 AD |
| 3,812,487 | 5/1974 | Burton | 340/324 AD |
| 3,821,731 | 6/1974 | Levine | 340/324 AD |

OTHER PUBLICATIONS

Doyle et al., TV Receiver Tuning Systems of the Future, IEEE Vol. BTR-15 No. 2, July 1969, pp. 200–222.

*Primary Examiner*—David L. Trafton
*Attorney, Agent, or Firm*—W. R. Sherman; K. McMahon; J. J. Kaliko

[57] ABSTRACT

An on-screen television display including means internally of the receiver for generating characters to indicate the channel number, time of day or other data. The system includes circuit means responsive to the horizontal and vertical sync signals of a television receiver for positioning and timing of the display. BCD data is coupled to a character generator, and the output of the character generator is then multiplexed with positioning and timing signals. The multiplexed output is coupled to a video interface which supplies the video signal to the cathode ray tube.

33 Claims, 8 Drawing Figures

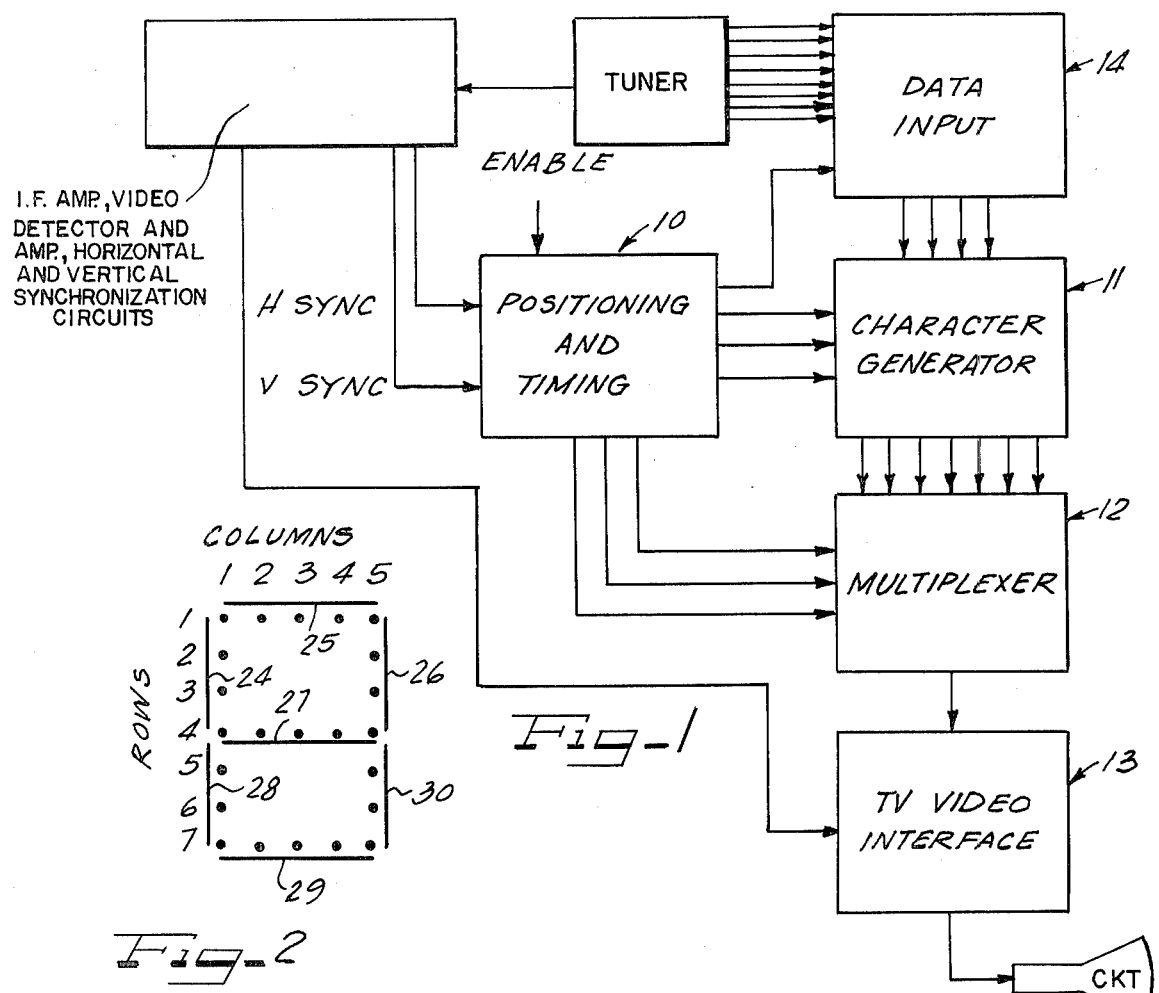
Fig-1
Fig-2
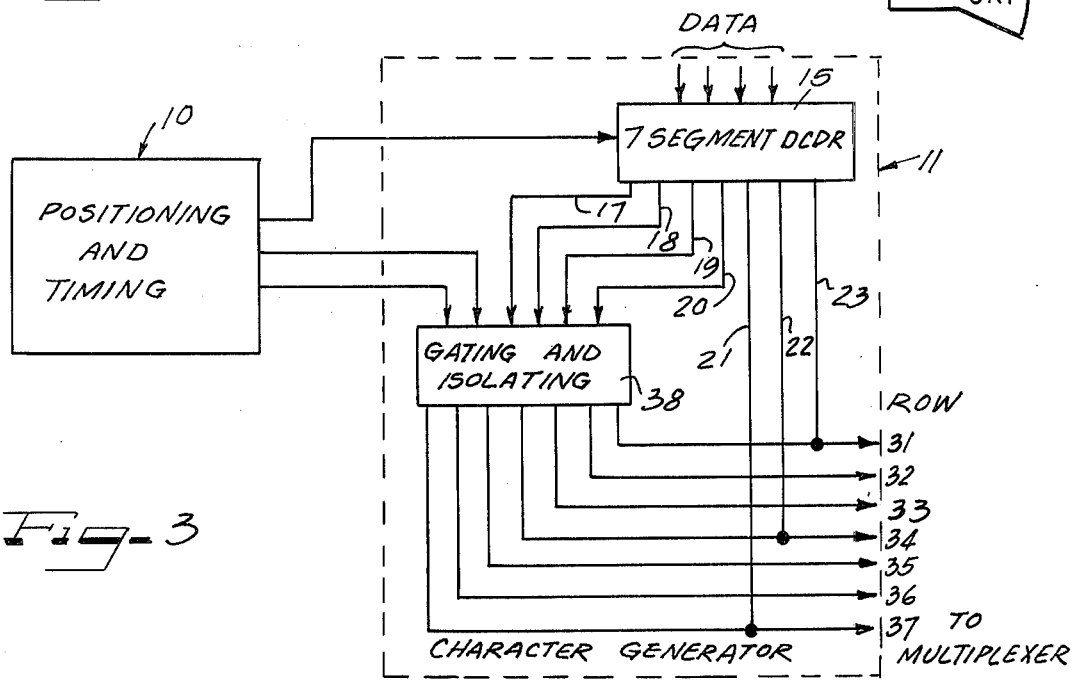
Fig-3

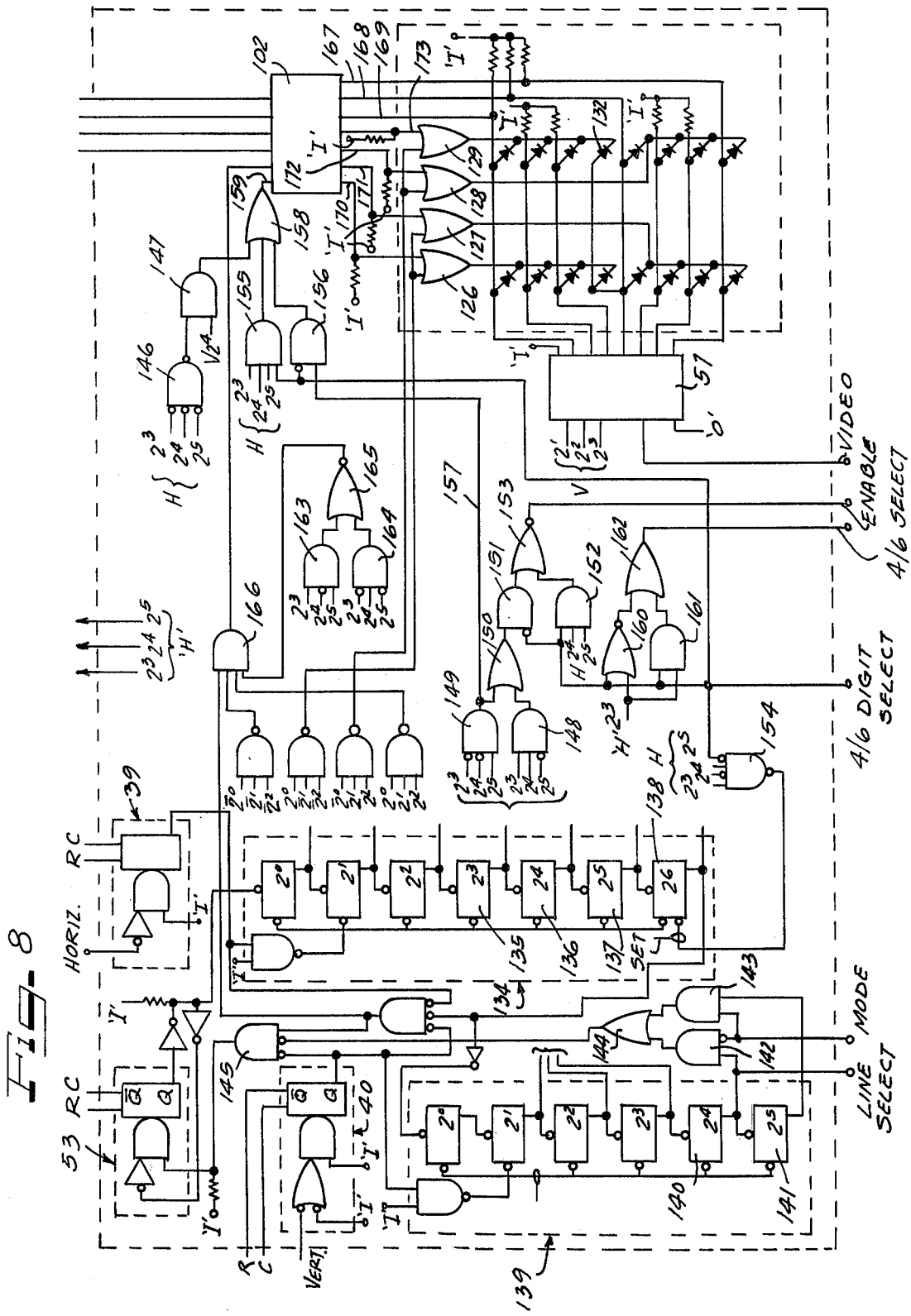

ON-SCREEN CHANNEL DISPLAY

This is a continuation of application Ser. No. 303,338 filed Nov. 3, 1972 now abandoned.

BACKGROUND OF THE INVENTION

The use of on-screen display of a channel number, for instance, has been proposed in an article entitled, "Broadcast and Television Receivers" IEEE, Vol. BTR-15, No. 2, July 1969, however, the character generators which are available commercially are generally "read only memories" designed to display either 16 or 64 alpha-numeric characters. These character generators require 350 memory bits for 10 characters. In such a device, all 35 possible positions in a 5 × 7 font are used for the numerals. The character generator is the most expensive element of such a system.

A Co-pending Patent Application of Ralph Joseph Ludlam entitled, "Electronic Channel Selection & Device", Ser. No. 265,231, now abandoned, describes a system for producing digital information representative of a selected channel. This data may be used by the display system of the present invention.

FIELD OF THE INVENTION

The field of art to which this invention pertains is on-screen display of characters in a television receiver with character generation locally in the receiver.

SUMMARY OF THE INVENTION

It is an important feature of the present invention to provide an improved system for the display of characters on the screen of a television receiver using character generating means locally in the receiver.

It is another feature of the present invention to provide a relatively inexpensive means for generating characters in a system as described above.

It is a principal object of the present invention to provide an on-screen character display system for a television receiver which utilizes a character generator having a segment decoder for transforming digital information into line segment information and having means for gating and multiplexing the line segment information into a usable video output signal.

It is a further feature of the present invention to provide a character generator described above including a seven segment decoder having direct coupling from the output of the decoder to a multiplexing stage for the horizontal segments of each character and having coupling to the multiplexer through a gating circuit for the vertical segments of the character.

It is a further feature of the present invention to provide a circuit as described above which includes a vertical and horizontal delay means as well as vertical and horizontal blanking means to properly position the characters at a predetermined location on the screen of the television receiver.

It is an additional feature of the present invention to provide a circuit as described above which includes means for blanking the character generating portion of the video signal between characters to provide adequate spacing.

It is also an object of this invention to provide circuit means for generating additional characters such as characters to indicate the time of day on the screen of a television receiver.

These and other objects, features and advantages of the present invention will be understood in greater detail from the following description and the associated drawings wherein reference numerals are utilized to designate a preferred embodiment.

BRIEF DESCRIPTION OF THE DRAWINGS

FIG. 1 is a general block diagram of an on-screen display system according to the present invention.

FIG. 2 is an illustration of the line segments used to form the characters in the seven segment decoder according to the present invention.

FIG. 3 is a block diagram of the character generator illustrated in FIG. 1.

FIG. 8 is a schematic similar in many respects to FIG. 6 but including additional circuitry to produce character displays for the proper time of day.

Referring to FIG. 1, there is shown a display system according to the present invention. In this figure, a positioning and timing circuit 10 is used to position the display on the raster and to provide timing signals to a character generator 11 and to a multiplexer 12.

Figure 4:
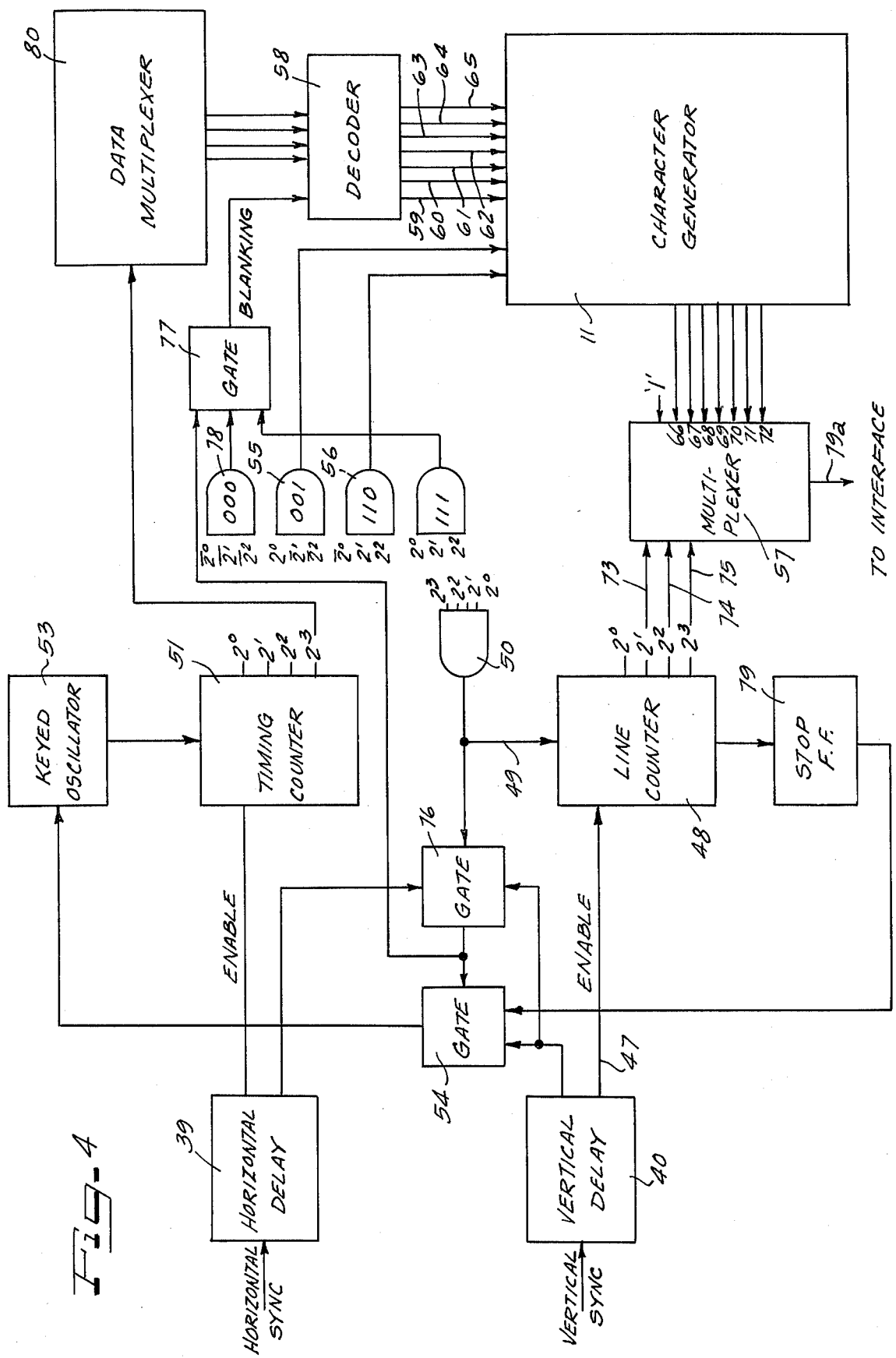
FIG. 4 is a more detailed block diagram of the circuit illustrated in FIG. 1.

The output of the multiplexer 12 is coupled to a TV interface system which is not shown in detail herein, but is the least expensive circuit in the system. Interface would be obvious to a skilled person and can be achieved by simply superimposing the display over the program video and keeping the display in white or black. Other interface systems could offer variations on the theme by providing the display to be in a given color. Assuming a tuner of the type shown in Co-pending Ludlam application, Supra, is being used, the channel number information is provided in the form of a code that is recognizable by the character generator. In this case, the channel number information is provided in Binary Coded Decimal form. In the present system, BCD code is provided on eight parallel lines, one group of four lines for each channel number digit.

The data input block 14 in FIG. 1 performs the function of multiplexing the two groups of four lines into one group of four lines. In other words, the data input circuit 14 is switching the inputs of the character generator between the two channel number digits.

The character generator is the most expensive part of the system shown in FIG. 1. Prior art character generators available for this function are designed to display either 16 or 64 alpha-numeric characters in a 5 × 7 font. The requirement for a channel display is that it be capable of displaying the numerals 0 through 9, thus making the 16 character numeric generator a logical choice. However, such a device is too costly for this type of a system. In such character generators, 350 (5 × 7 × 10) memory bits are required for 10 characters. This device uses all 35 possible positions in a 5 × 7 font of the type shown in FIG. 2.

The present invention utilizes the seven segment numeral. In FIG. 2, it can be seen that all numerals are constructed from a combination of four vertical straight line segments and three straight horizontal line segments.

The four vertical segments occupy only two of the five vertical columns. Each vertical segment occupies four positions in a column of seven horizontal positions. The center position in columns 1 and 5 are shared by the upper and lower vertical segments.

Each horizontal segment in the font shown in FIG. 2 occupies a complete row of five positions. The extreme positions of each horizontal segment are shared with the extreme positions of each vertical segment. Only 23 positions, out of a possible 35 are actually utilized. If the numeral is being scanned horizontally as in a conventional television receiver, it can be seen that if any horizontal segment is selected there is no change in that row for the entire period that the numeral is being scanned. Accordingly, the 15 positions in the three horizontal rows can be reduced to three positions. The total number of positions required can be reduced to $(4 \times 4) + 3 = 16 + 3 = 19$ positions. Also, columns 2, 3 and 4 can be eliminated from the memory because there will never be any change in those three columns as any row is being scanned.

With the above view of the font shown in FIG. 2, memory can be eliminated if a seven segment decoder is used to select the segments which are required to construct a given numeral. The selection is accomplished in accordance with a code in BCD form provided at the input to the decoder.

Referring to FIG. 3, which further illustrates the character generator 11, a seven segment decoder 15 has seven output lines 17 through 23, one for each of the segments 24 through 30 shown in FIG. 2. The three output lines 21, 22, and 23 are for the top, center and lower horizontal segments 25, 27 and 29 respectively. The four vertical segment output lines 17, 18, 19 and 20 must first be coupled through gating and isolating circuitry 38. Such circuitry provides switching action to switch on and off the horizontally scanning electron beam in order to reproduce the vertical segments 24, 26, 28 and 30.

Figure 5:
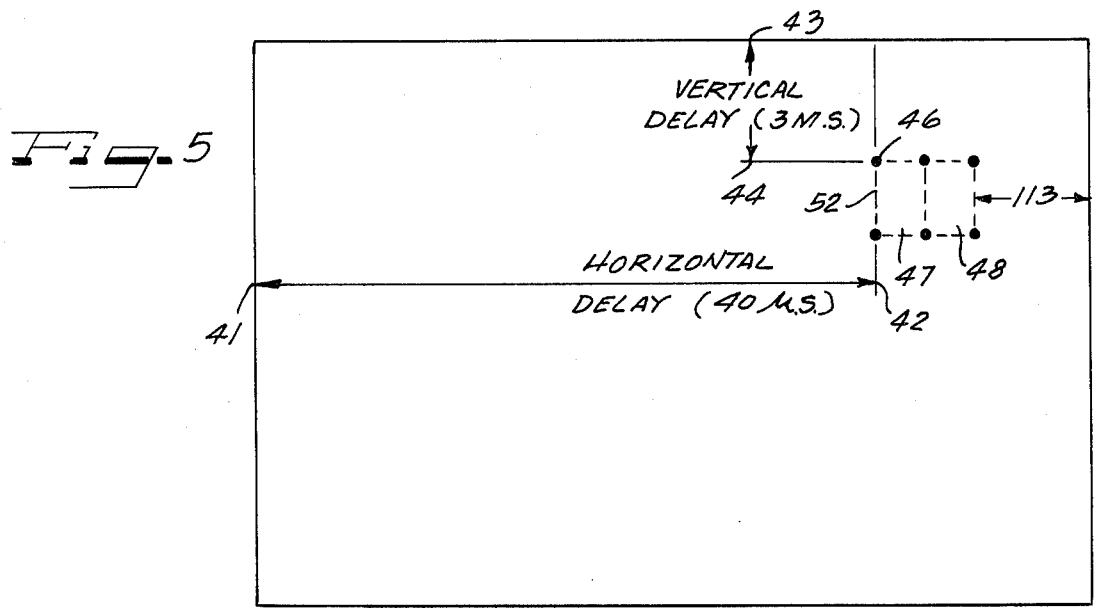
FIG. 5 is an illustration of the screen of a television receiver showing the positioning of character windows on the screen.

Referring to the block diagram of FIG. 4, the timing and positioning function performed by circuit 10 of FIG. 1 is initiated by the use of two delay circuits, namely, a horizontal delay circuit 39 and a vertical delay circuit 40. The horizontal delay circuit 39 produces a delay during each scan of the cathode ray beam between points 41 and 42 as shown in FIG. 5. The vertical delay circuit 40 produces a delay during the vertical time interval indicated between points 43 and 44 of FIG. 5. When the scanning beam reaches a point 46 to begin the scan of the display windows 47 and 48, the vertical delay has lapsed and an output is produced on a line 47 (FIG. 4). A line counter 48 then begins counting raster lines as indicated by a series of pulses delivered to the counter 48 at an input 49. The pulses delivered to the input 49 are coupled from a gate 50 which has its inputs coupled from like identified inputs of a timing counter 51.

The horizontal delay circuit 39 enables the timing counter 51 each time the scanning beam reaches a horizontal position indicated by the dashed line 52 in FIG. 5. When the counter has counted 16 pulses from a keyed oscillator 53, the gate 50 produces the required output pulse which is then fed to the line counter 48. This output pulse indicates the scanning of a single line on the raster.

At the same time that the timing counter 51 is enabled by the lapse of the delay associated with the circuit 39, the keyed oscillator 53 is started through a gate 54 which has an output from the vertical delay circuit 40 coupled thereto. With the timing counter started, outputs coupled to AND gates 55 and 56 provide gating signals to the character generator 11. The gates 55 and 56, in turn, enable gates in the character generator 11 to couple the signals indicative of the four vertical segments 24, 26, 28 and 30 (FIG. 2) to a multiplexer 57.

A seven segment decoder 58 has a series of outputs 59 through 65 which are coupled to the character generator 11. The first four of these outputs, 59 through 62 represent the four vertical segments, 24, 28, 26 and 30 of the seven segment character of FIG. 2. The remaining three outputs represent the three horizontal segments of the character.

The multiplexer 57 has a series of inputs 66 through 72 which are scanned by virtue of timing signals coupled at additional inputs 73 through 75 and derived from the line counter 48. The seven inputs 66 through 72 represent the gated vertical segments and the three horizontal segments derived from the decoder 58. Additional gates 76 and 77 as well as a gate 78 and a flip flop circuit 79 are used in performing the blanking function which is described further in conjunction with FIG. 6.

The final output of the circuit is derived at a circuit line 79a which is a digital signal which may be coupled to a suitable video interface circuit to provide the proper amplitude and isolation.

Figure 6:
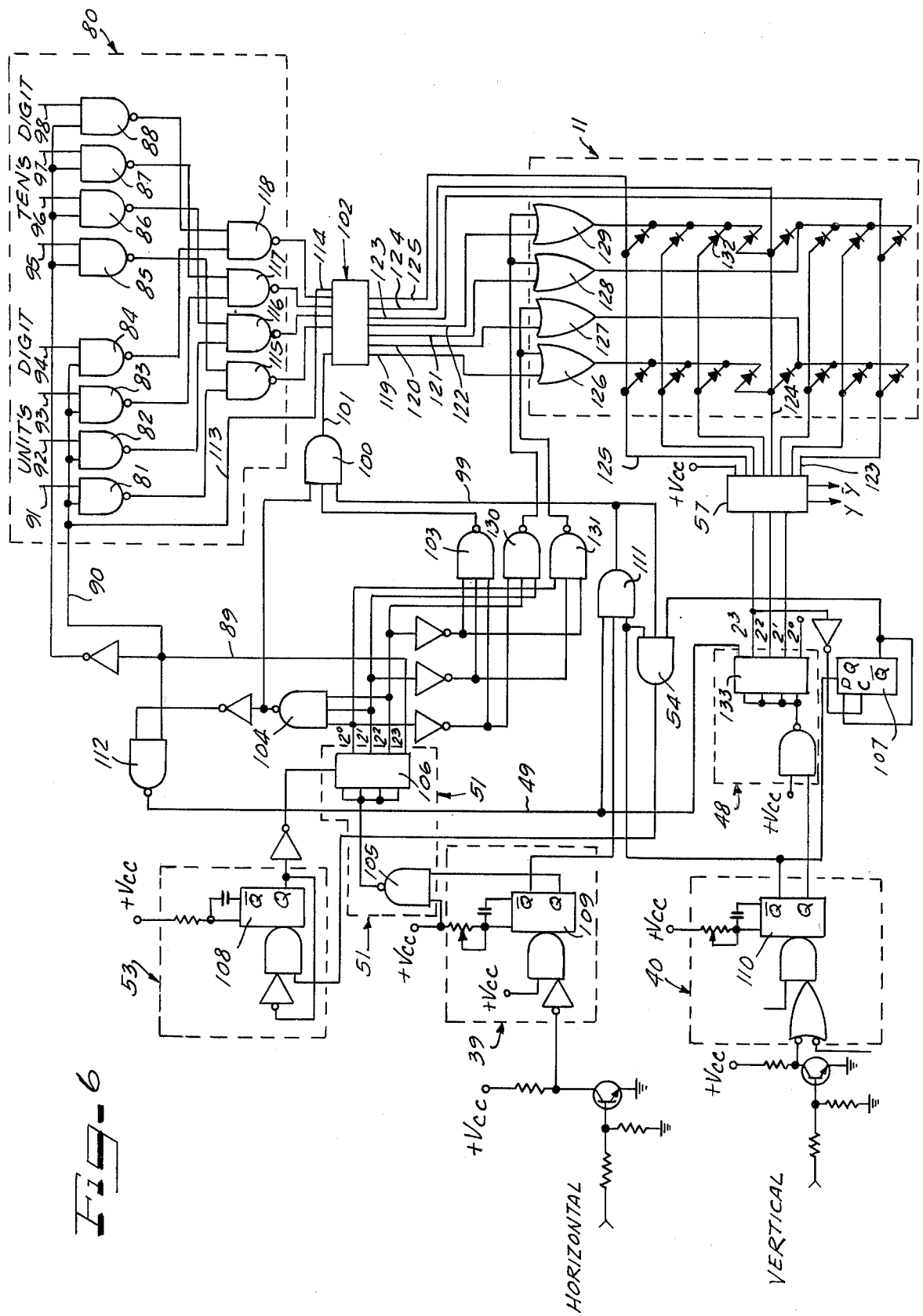
FIG. 6 is a schematic of the digital circuit used in the block diagram of FIG. 4.

A data multiplexer 80 is shown in FIG. 4 and illustrated in greater detail in FIG. 6. The data multiplexer has units digits and tens digits gates 81 through 88 as shown in FIG. 6. Switching from the tens digits to the units digits gates is accomplished at the beginning of the ninth count from the output of the timing counter 51 by way of circuit lines 89 and 90. This permits shifting of the display from the tens display window 47 to the units display window 48 (FIG. 5).

The video output from the multiplexer 57 is blanked for all portions of the scan outside of the display windows 47 and 48. Firstly, it is blanked by a signal from the vertical delay circuit 40 through the gate 111 and a line 99 to a gate 100 which has an output 101 coupled directly to a seven segment decoder 102. This blanking is accomplished during the vertical delay from the top of the raster to the top of the display window as illustrated by the 3 m.s. delay shown in FIG. 5.

Figure 7:
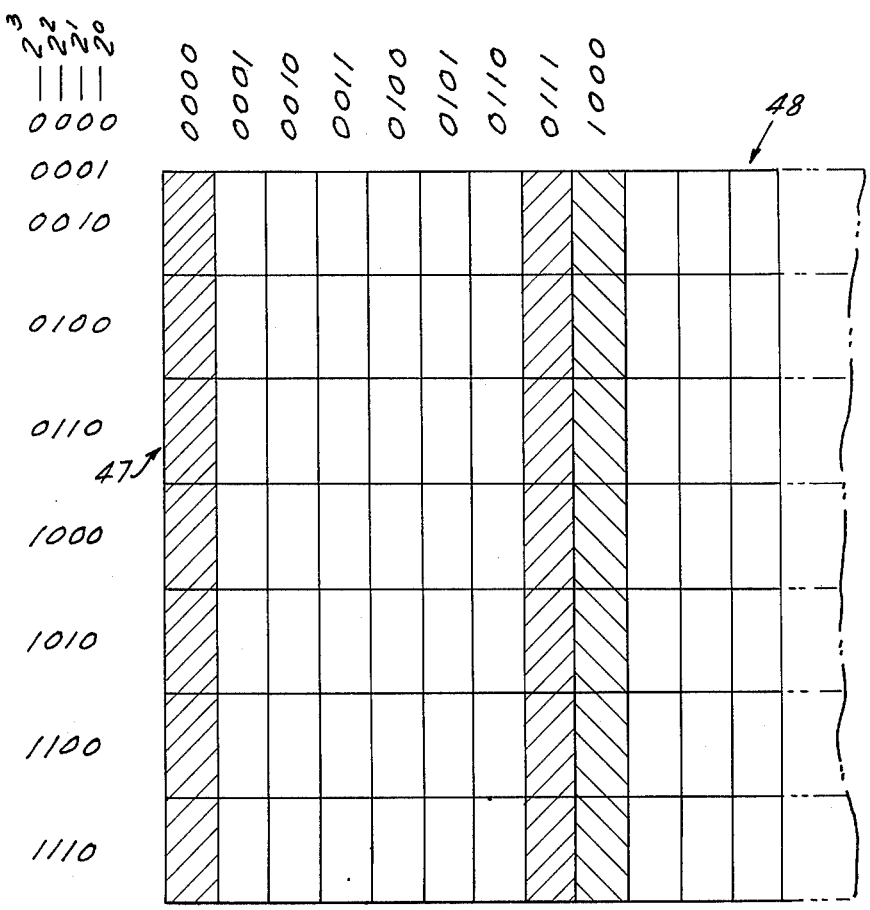
FIG. 7 is a detailed illustration of one of the windows shown in FIG. 5.

Two gates 103 and 104 provide blanking in the 000 and 111 horizontal time intervals as shown in the enlarged display window of FIG. 7. The inputs from these gates are derived by the proper combination of signals from the timing counter 51 which includes a gate 105 and a four bit binary counter 106. This blanking is required at the beginning of the horizontal scan and at the end of the scan for each window. The blanking is accomplished by producing '0' inputs to the gate 100 which in turn produces all ones at the output of the decoder 102. The result is that all logic inputs to the multiplexer 57 become logic '1', and there is a '0' logic output.

Blanking is also accomplished after the line counter 48 reaches the last line of the display by producing a logic '1' at the C input of a flip flop 107. This develops a logic '0' at the Q output of the flip flop 107 which, in turn, produces a logic '0' input to the gate 54. The output of the gate 54 turns off the keyed oscillator 53 causing the desired blanking. The keyed oscillator 53 includes a monostable multivibrator 108. Similar monostable multivibrators 109 and 110 are provided in the circuits 39 and 40 respectively. Multivibrators 109 and 110 are adjustable to adjust vertical and horizontal delays.

Blanking to the left of the display window 47 is accomplished by utilizing the Q output of the horizontal delay circuit 39. At the beginning of the horizontal scan, the Q output is '0', producing a '0' output at the gate 111. The output of the gate 111, being '0', then develops a '0' output at the gate 100. This produces all ones at the output of the seven segment decoder 102 resulting in an '0' output for the multiplexer 57.

At the end of the horizontal count, a gate 112 produces a '0' output to generate blanking in the space after the display area. This space is illustrated as 113 in FIG. 5. The output of the gate 112 is coupled to the gate 111 which produces blanking in the same manner as described in connection with the blanking in the space to the left of the display window area.

It is also desirable to blank the numeral 0 which would otherwise appear in the tens digits display window so that Channel 2 appears as "2" rather than "02". This is accomplished by way of a circuit line 113 which is coupled from the input of the unit digit gates 81 through 84. The line 113 is connected to an input 114 of the seven segment decoder 102. During display of the tens digits, the input to the units digits gates is logic '0', and when a 0 would normally be displayed in the tens digit display window, a logic '0' would appear at the output of gates 115 through 118. The seven segment decoder 102 produces a '1' at each output 119 through 125 when a logic '0' appears at its inputs. The result is all logic ones at the input to the multiplexer 57 and a '0' output to the video interface.

The outputs 119 through 122 of the decoder 102 are coupled to gates 126, 127, 128 and 129. These gates provide the switching action for the outputs 119 through 122 which carry the data for the vertical segments of the seven segment font shown in FIG. 2. The switching is accomplished further through a pair of gates 130 and 131 which have the proper inputs coupled thereto from the counter 106.

The output of the gates 126 through 129 are coupled to selected inputs of the multiplexer 57, and a plurality of isolation diodes such as the diode 132 are provided as shown.

The multiplexer 57 receives timing signals from a counter 133 which may be a four bit binary counter. This is part of the line counter circuit 48 illustrated in FIG. 4. In this way, the data available at the input to the multiplexer 57 is sampled at the proper time intervals as the beam scans the raster.

In FIG. 8 the digital circuit is modified from that shown in FIG. 6 and includes additional circuitry to provide for a two line, six digit display for the purpose of displaying information in addition to the channel number. In this particular embodiment, the additional information displayed is the time of day.

The time is displayed on the second line of the display in either 4 digits (hours and minutes) or six digits (hours, minutes and seconds).

Referring first to the seven segment decoder 102, the data input including gates 81 through 88 and 115 through 118 have been omitted for simplicity. In the embodiment shown in FIG. 6, 8 data lines were multiplexed into 4 lines. In this embodiment, the input data multiplex circuit must now multiplex an additional number of lines into 4 lines. This is accomplished by circuitry similar to that shown in FIG. 6.

Counter 106 in FIG. 6 was a four bit binary counter. This has been replaced in FIG. 8 by an expanded seven bit counter 134 to accommodate a six digit display. The stages 135, 136 and 137 comprise the horizontal character counter and the stage 138 is the "stop" stage. Two positions of the stages 135 through 137 are blanked to provide character spacing.

In the embodiment shown in FIG. 6, four bit counter 133 and flip flop 107 comprise the vertical line counter. The vertical line counter in FIG. 8 has been expended to a six bit binary counter to accommodate a second horizontal line of information. This counter is identified by the reference numeral 139. The stage 140 is the vertical character counter, and the stage 141 is the "stop" flip flop. The stage 140 can be switched from modulo 1 to modulo 2 to select channel display only or channel plus time by the logic level of the "mode" line. Gates 142, 143 and 144 select the output of either the stage 140 for channel only or the stage 141 for channel plus time display as the "stop" pulse to disable a gate 145 which is similar to the gate 54 of FIG. 6.

Gates 146 and 147 decode horizontal character position 000 in the second line of display, causing blanking if the data input at that time is a decimal 0. This position would correspond to the hours tens digits and it is desired to blank a 0 in this digit position for the same reason the 0 is blanked in the tens channel position in FIG. 6. Gates 148 and 149 decode horizontal character positions 011 and 100 respectively. The outputs of these two gates are combined in an OR gate 150 and fed to an input of a further gate 151. Gate 152 decodes horizontal character positions 110 and 111. The four-six digit select lines select the output of either gate 151 or 152. The selected output is fed to NOR gate 153. The output of NOR gate 153 when a logic '0' is the "enable" pulse. This enable pulse is fed to the channel number data multiplexer. When the enable pulse is logic '0' during line 1, multiplex channel number data will be present at the data inputs of the decoder 102. When the enable line is logic '2' during line 1, '0' will be present at the data inputs of the decoder 102.

A logic '1' at the four-six digit select line enables gate 152, causing the enable line to be logic '0' during horizontal character positions 110 and 111. The channel number thus appears in positions 110 and 111. A logic '0' on the four-six select line enables gate 151, and the channel number appears in position 011 and 100.

Gate 154 decodes horizontal character position 101. With a logic '0' on the four-six digit select line, gate 154 is enabled causing the stage 138 of counter 134 to be "set" to logic '1' at the beginning of horizontal character position 101. This is the 'stop' stage of the counter 134. Hence, the display is stopped at the end of five horizontal character positions or four display digits. When the four-six digit select line is logic '1', gate 154 is disabled thus allowing counter 134 to stop at the end of eight horizontal character positions or six display digits. Hence, the signal applied to the four-six select line controls the number of digits to be displayed.

Gate 155 decodes horizontal character position 111. Decoded horizontal position 100 from gate 149 is fed to one input of gate 156 by way of line 157 with the selected output being fed through OR gate 158 to an input 159 of the decoder 102. A logic '0' at the input 159 disables decoder 102 only if its data input is '0'. A logic '1' at input 159, enables decoder 102 for any decimal number at the data input.

A logic '1' on the four-six digit select line enables gate 155 which, in turn, enables decoder 102 during horizontal character position 111. A logic '0' on the four-six digit select line enables gate 156, thereby enabling decoder 102 during position 100.

Gates 160, 161 and 162 supply a "select" pulse to the channel number data multiplexer similar to that shown in FIG. 6. The stage 135 of counter 134 is fed directly with 'six' digit selected or inverted with 'four' digit selected in order to read out the channel number digits in the correct order.

Gates 163 and 164 decode horizontal character position 010 and 101 which are combined in NOR gate 165 and fed to one input of an AND gate 166. These gates "blank" decoder 102 during those two positions. This provides the required spacing between characters as discussed in conjunction with the circuit of FIG. 6.

Accordingly, it can be seen that the circuit shown in FIG. 8 represents an expanded circuit to provide additional character display positions and an additional line of display. A similar system could of course be provided to include additional display information, however, the complexity would increase accordingly.

The function of the output from the decoder 102 is basically the same as that shown in conjunction with FIG. 6. The horizontal segment lines 167, 168 and 169 are directly fed to the multiplexer 57, and the vertical lines 170, 171, 172 and 173 are fed through the gates 126 through 129 to provide the required gating of the vertical segments during the horizontal sweep. Through this sytem, an effective and realistically priced digital circuit for display of channel number and other information, such as time of day, is provided. This type of circuit then becomes an effective system when used in combination with a varactor tuner operated by electronic channel switching.

I claim:

1. A system for displaying a character indicating the channel being received on the raster of a broadcast television receiver comprising: means for developing coded data indicative of the character to be displayed, decoding means having a plurality of inputs and outputs, means for coupling the coded data to given inputs of said decoding means, said decoding means being a device for developing signals on a predetermined combination of outputs in response to each selected coded input, circuit means for processing the signal on each of said outputs of said decoder into a given line segment generated video signal and comprising means for multiplexing the outputs of said decoding means in accordance with the line of scan of the beam of the cathode ray tube of said broadcast television receiver, and means for adding the generated video signal in a video circuit of said broadcast television receiver to develop a character display on the raster of the television receiver in addition to any other signal being processed by said video circuit.

2. A display system in accordance with claim 1 wherein said decoding means comprises a seven segment decoder.

3. A display system in accordance with claim 2 wherein a line counter is provided to count horizontal scans of the cathode ray beam and wherein the output of said counter is coupled to said multiplexer to control the same.

4. A display system in accordance with claim 1 wherein said decoder is a seven segment decoder and wherein means are provided to gate the data output of said decoder which represent the vertical segments of the character to be displayed during given horizontal scans of the beam of the cathode ray tube.

5. A system, in accordance with claim 1 including timing circuit means, means for multiplexing coded data representing each of said characters in accordance with timing signals from said timing circuit means, a seven segment decoder for decoding said multiplexed data, and means for using said decoded data to apply a video signal to the cathode ray tube of the television receiver.

6. A display system in accordance with claim 5 wherein there is provided an oscillator, means for keying the operation of the oscillator to the horizontal sync of the television receiver, and a counter for counting an output of said oscillator and for producing said timing signals.

7. A channel number display system in accordance with claim 6 wherein said data multiplexer has units digits gates and tens digits gates, said timing signal multiplexing data between said units and tens digits gates into at least four output lines, and means for coupling said multiplexed data to inputs of said seven segment decoder.

8. A channel number display system in accordance with claim 7 wherein means are provided to blank the display system output for a time interval between the switching of said data multiplexer from the units digits gates to the tens digits gates to provide spacing between the units and tens characters on the raster of the cathode ray tube.

9. A channel number display system in accordance with claim 8 wherein select means are provided to select one of a greater number of variable character displays, said means including a BCD signal responsive select circuit.

10. A channel number display system in accordance with claim 9 wherein said select means includes a four-six character select circuit for selecting either four or six character display.

11. A system for displaying a character on the raster of a television receiver comprising: means for developing coded data indicative of the character to be displayed, a seven segment decoder, means for coupling the coded data to the input of the seven segment decoder, means for using the output of the seven segment decoder to illuminate a seven segment display on the raster of a cathode ray tube, and wherein three outputs of the seven segment decoder represent the horizontal segments of the character to be displayed and the remaining four outputs represent the vertical segments thereof, and wherein there is provided a multiplexer, a horizontal scan counter, means for coupling the counter outputs to the multiplexer, means for coupling the three horizontal segment outputs to the multiplexer, a timing counter, means for using the timing counter to gate the four vertical segment outputs during each scan associated with the character display, and means for coupling the four gated vertical segment outputs to the multiplexer.

12. A display system in accordance with claim 11 wherein there is provided an oscillator, means for keying the oscillator to the horizontal scan of the cathode ray beam, said oscillator having a frequency substantially higher than the horizontal line frequency of the cathode ray tube, means for coupling the output of the oscillator to the timing counter to control the same.

13. A display system in accordance with claim 12 wherein means are provided to use the horizontal sync signal of the television receiver to enable said timing counter.

14. Apparatus for use with a television receiver, said receiver comprising a horizontal scanning circuit, a vertical scanning circuit, a video signal circuit, and a display device coupled to said scanning and video signal circuits, and creating a character on said display device in the form of line segments oriented in generally horizontal and vertical directions and superimposed over other information displayed thereon and comprising:
  data means for developing coded data indicative of the character to be displayed;
  decoding means having a plurality of outputs and producing at each of said outputs a signal representative of the presence of a corresponding line segment in the character to be displayed;
  an oscillator coupled to said horizontal scanning circuit and synchronized to the operation of said horizontal scanning circuit and producing a signal at a frequency greater than the horizontal scanning frequency;
  counting means coupled to the output of said oscillator and developing signals representative of the position of the horizontal scan;
  gating means coupled to said decoding means and said counting means and gating said signals representative of the presence of a corresponding generally vertical line segment in response to the position of the horizontal scan;
  matrix means for matrixing said gated signals representative of the presence of corresponding generally vertical line segments and said signals representative of corresponding generally horizontal line segments to form a plurality of line signals each representative of the video signal required to generate said character on said display device during a horizontal scan;
  signal selection means for selecting one of said line signals in accord with the position of the vertical scan; and
  combining means coupled to said video signal circuit for combining said selected line signal with a signal representative of said other information displayed on said display device.

15. The apparatus of claim 14 wherein said character is displayed in the form of the presence or absence of seven line segments and said decoding means comprises a seven segment decoder having seven outputs and producing at each of said outputs a signal representative of the presence of a corresponding one of said seven line segments in the character to be displayed.

16. The apparatus of claim 14 creating at least two characters on said display device wherein said data means develops coded data indicative of the characters to be displayed and said apparatus further comprises multiplex means coupled to said data means, said decoding means and said counting circuitry for applying to said decoding means coded data indicative of different characters to be displayed in response to the position of the horizontal scan.

17. The apparatus of claim 16 further comprising means for preventing the display of said characters for a time interval including the switching of said multiplex means to provide spacing between said characters.

18. The apparatus of claim 14 further comprising a time delay circuit coupled between said oscillator and said horizontal scanning circuit and preventing the operation of said oscillator until a predetermined time period has elapsed following the commencement of a horizontal scan.

19. Apparatus for use with a television receiver, said receiver comprising a first scanning circuit for scanning in a first direction, a second scanning circuit for scanning in a second direction generally perpendicular to said first direction, a video signal circuit, and a display device coupled to said scanning and video signal circuits, and creating a character on said display device in the form of line segments oriented in generally said first and second directions and superimposed over other information displayed thereon and comprising:
  data means for developing coded data indicative of the character to be displayed;
  decoding means having a plurality of outputs and producing at each of said outputs a signal representative of the presence of a corresponding line segment in the character to be displayed;
  timing and gating means coupled to said decoding means and said first scanning circuit and gating said signals representative of the presence of a corresponding line segment in said second direction in response to the position of the scan in said first direction;
  matrix means for matrixing said gated signals representative of the presence of corresponding line segments in said second direction and signals representative of corresponding line segments in said first direction to form a plurality of line signals each representative of the video signal required to generate said character on said display device during a scan in said first direction;
  signal selection means for selecting one of said line signals in accord with the position of the scan in said second direction; and
  combining means coupled to said video signal circuit for combining said selected line signal with a signal representative of said other information displayed on said display device.

20. A system for displaying at least two characters on the raster of a television receiver comprising: an oscillator, means for keying the operation of the oscillator to the horizontal sync of the television receiver, a counter for counting an output of said oscillator and for producing timing signals, means for developing and multiplexing coded data representing each of said characters to be displayed in accordance with said timing signals, a seven segment decoder having a plurality of inputs and outputs for developing signals on a predetermined combination of said outputs in response to each selected coded input, means for coupling the coded data to given inputs of said decoder, circuit means for processing the signal on each of said outputs of said decoder into a given line segment generated video signal, and means for adding the generated video signal in the television receiver video circuit to develop a character display on the raster of the television receiver in addition to any other signal being processed by said video circuit.

21. A channel number display system in accordance with claim 20 wherein said data developing and multiplexing means has units digits gates and tens digits gates, said timing signal multiplexing data between said units and tens digits gates into at least four output lines, and means for coupling said multiplexing data to inputs of said seven segment decoder.

22. A channel number display system in accordance with claim 21 wherein means are provided to blank the display system output for a time interval between the switching of said data developing and multiplexing means from the units digits gates to the tens digits gates to provide spacing between the units and tens characters on the raster of the cathode ray tube.

23. A channel number display system in accordance with claim 22 wherein select means are provided to select one of a greater number of variable character displays, said means including a BCD signal responsive select circuit.

24. A channel number display system in accordance with claim 23 wherein said select means includes a four-six character select circuit for selecting either four or six character display.

25. A system for displaying a character indicating the channel being received on the raster of a broadcast television receiver comprising: means for developing coded data indicative of the character to be displayed, decoding means having a plurality of inputs and outputs, means for coupling the coded data to given inputs of said decoding means, said decoding means being a device for developing signals on a predetermined combination of outputs in response to each selected coded input, circuit means for processing the signal on each of said outputs of said decoder into a given line segment generated video signal and comprising an oscillator having a frequency substantially higher than the horizontal line frequency of said broadcast television receiver and means responsive to the horizontal synchronization signal of received broadcast television signals for keying said oscillator, and means for adding the generated video signal in a video circuit of said broadcast television receiver to develop a character display on the raster of the television receiver in addition to any other signal being processed by said video circuit.

26. A display system in accordance with claim 25 wherein said circuit means further comprises counting means coupled to the output of said oscillator and developing signals indicative of the horizontal position of the beam of the cathode ray tube of said broadcast television receiver.

27. A display system in accordance with claim 26 further comprising means coupled to the horizontal scan circuitry of said broadcast television receiver and said counting means for resetting said counting means.

28. A system for displaying a character indicating the channel being received on the raster of a broadcast television receiver comprising: means for developing coded data indicative of the character to be displayed, decoding means having a plurality of inputs and outputs, means for coupling the coded data to given inputs of said decoding means, said decoding means being a device for developing signals on a predetermined combination of outputs in response to each selected coded input, circuit means for processing the signal on each of said outputs of said decoder into a given line segment generated video signal and comprising an oscillator having a frequency substantially higher than the horizontal line frequency of said broadcast television receiver, means responsive to the horizontal synchronization signal of received broadcast television signals for keying said oscillator, and means for multiplexing the outputs of said decoding means in accordance with the line of scan of the beam of the cathode ray tube of said broadcast television receiver, and means for adding the generated video signal in a video circuit of said broadcast television receiver to develop a character display on the raster of the television receiver in addition to any other signal being processed by said video circuit.

29. A display system in accordance with claim 28 wherein said decoding means comprises a seven segment decoder.

30. A display system in accordance with claim 28 wherein a line counter is provided to count horizontal scans of the cathode ray beam and wherein the output of said counter is coupled to said multiplexing means to control the same.

31. A display system in accordance with claim 30 further comprising means coupled to the horizontal scan circuitry of said broadcast television receiver and said counting means for resetting said counting means.

32. A system for displaying a character indicative of the channel being received on the picture display device of a broadcast television receiver comprising: means for developing data indicative of the character to be displayed, decoding means having a plurality of inputs and outputs, means for coupling said data to inputs of said decoding means, said decoding means being a device for developing signals on a predetermined combination of outputs in response to each data input, circuit means for processing the signal on said outputs of said decoder into a video signal for generating a line segment character and including an oscillator having a frequency substantially higher than the horizontal line frequency of said broadcast television receiver and means responsive to the horizontal synchronization signal of received broadcast television signals for keying said oscillator, and means for adding said video signal to other video signals being processed by said broadcast television receiver to develop a character display on said picture display device.

33. A system for displaying a character indicative of the channel being received on the picture display device of a broadcast television receiver comprising: means for developing data indicative of the character to be displayed, decoding means having a plurality of inputs and outputs, means for coupling said data to inputs of said decoding means, said decoding means being a device for developing signals on a predetermined combination of outputs in response to each data input, circuit means for processing the signal on said outputs of said decoder into a video signal for generating a line segment character and including an oscillator having a frequency substantially higher than the horizontal line frequency of said broadcast television receiver and means responsive to the horizontal synchronization circuitry of said broadcast television receiver for keying said oscillator, and means for adding said video signal to other video signals being processed by said broadcast television receiver to develop a character display on said picture display device.

* * * * *